(12) United States Patent
Garate Álvaro et al.

(10) Patent No.: US 8,702,388 B2
(45) Date of Patent: Apr. 22, 2014

(54) CALIBRATION OF BLADE LOAD SENSORS

(71) Applicant: Alstom Wind, S.L.U., Barcelona (ES)

(72) Inventors: José Miguel Garate Álvaro, Barcelona (ES); Isaac Pineda Amo, Sant Cugat del Vallès (ES)

(73) Assignee: Alstom Wind, S.L.U., Barcelona (ES)

( * ) Notice: Subject to any disclaimer, the term of this patent is extended or adjusted under 35 U.S.C. 154(b) by 0 days.

(21) Appl. No.: 13/738,898

(22) Filed: Jan. 10, 2013

(65) Prior Publication Data

US 2013/0183151 A1 Jul. 18, 2013

Related U.S. Application Data

(60) Provisional application No. 61/609,780, filed on Mar. 12, 2012.

(30) Foreign Application Priority Data

Jan. 12, 2012 (EP) ..................................... 12382008

(51) Int. Cl.
F03D 7/02 (2006.01)
(52) U.S. Cl.
USPC ..................................... 416/1; 416/35; 416/61
(58) Field of Classification Search
USPC ................................ 290/44; 416/1, 35, 31, 61
See application file for complete search history.

(56) References Cited

U.S. PATENT DOCUMENTS

| 8,157,522 | B2* | 4/2012 | Bolz | 416/35 |
| 8,265,885 | B2* | 9/2012 | George | 702/34 |
| 8,360,722 | B2* | 1/2013 | Hoffmann et al. | 416/1 |
| 2002/0000723 | A1* | 1/2002 | Weitkamp | 290/44 |
| 2009/0263246 | A1 | 10/2009 | Bolz | |
| 2011/0210551 | A1* | 9/2011 | Scholte-Wassink | 290/44 |

FOREIGN PATENT DOCUMENTS

EP WO 2011/092032 A1 1/2012

OTHER PUBLICATIONS

Extended Search Report in EP 12382008.6, mailed Jun. 5, 2012, 4 pgs.

* cited by examiner

*Primary Examiner* — Nathaniel Wiehe
*Assistant Examiner* — Woody A Lee, Jr.
(74) *Attorney, Agent, or Firm* — Squire Sanders (US) LLP

(57) ABSTRACT

A method of calibrating one or more load sensors of a blade of a wind turbine, said wind turbine comprising a main generator, a power electronic converter connected with the main generator, and a rotor operationally connected with the main generator and carrying the blade. The method comprises acting on the power electronic converter to operate the main generator as motor to set the blade in at least one predetermined condition. The method further comprises measuring loads in the predetermined condition using the load sensors of the blade and calibrating the blade load sensors taking into account the measured loads.

14 Claims, 4 Drawing Sheets

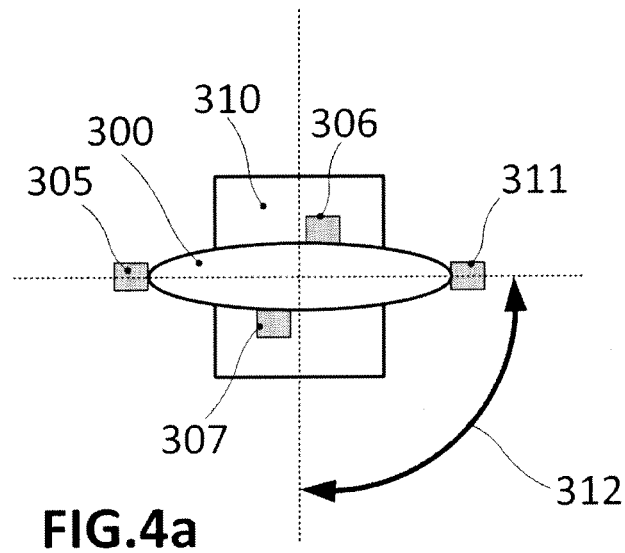
FIG.4a
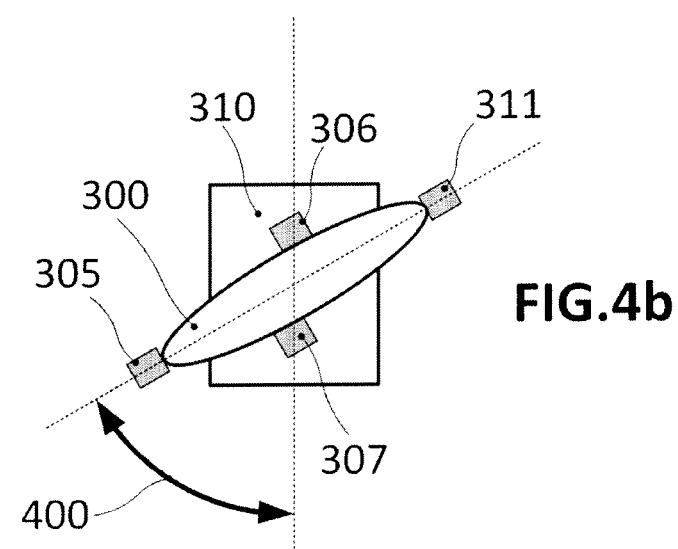
FIG.4b
FIG.4

CALIBRATION OF BLADE LOAD SENSORS

This application claims the benefit of European Patent Application EP 12382008.6 filed Jan. 12, 2012 and U.S. Provisional Patent Application Ser. No. 61/609,780 filed Mar. 12, 2012.

The present invention relates to a method of calibrating one or more load sensors of a blade of a wind turbine, and to a wind turbine suitable to carry out such a method.

BACKGROUND ART

Modern wind turbines are commonly used to supply electricity into the electrical grid. Wind turbines of this kind generally comprise a rotor with a rotor hub and a plurality of blades. The rotor is set into rotation under the influence of the wind on the blades. Said rotation generates a torque that is normally transmitted, either directly or through the use of a gearbox, to a main generator through a rotor shaft. This way, the main generator produces electricity which is to be supplied into the electrical grid.

Wind turbines may comprise pitch systems that are employed for adapting the position of the blades to varying wind conditions by rotating each blade along its longitudinal axis. Wind turbines may also comprise load sensors on the blades for measuring loads on the blades caused by for example the wind and/or the weight of the blades.

Too high loads on the blades can e.g. damage the blades and/or cause undesirable rotational speeds of the rotor which may damage other components of the wind turbine. The blade load sensors permit detecting high loads and make it possible to react, by e.g. acting on the pitch systems in such a way that loads on the blades may be reduced. These adjustments on the blades through the pitch systems may extend the life of the wind turbine and/or reduce the cost of producing power.

Blade load sensors can be calibrated in order to preserve their accuracy when taking measurements of the loads on the blades. Calibration normally comprises establishing correspondence between indications generated by the blade load sensors and values of reference according to calibration patterns (i.e. particular conditions for calibration). If the calibration process produces some inconsistency, suitable adjustments may be undertaken on the load sensors to improve their accuracy.

It is known that blade load sensors can be manually calibrated in a factory by e.g. statically pulling the blades to obtain particular conditions for calibration. This manual calibration is normally performed before mounting the blades on the wind turbine. However, over time, load sensors may need to be recalibrated.

It is also known that blade load sensors can be manually calibrated when the blades are mounted on the wind turbine by manually (i.e. mechanically) acting on the wind turbine to e.g. set the blade in a particular position (e.g. horizontal position) with a particular pitch angle. This manual calibration permits recalibrating the load sensors regularly. However this type of calibration may take a long time and may be especially expensive for offshore wind turbines because operators need to go where the wind turbine is located.

It is also known to use automatic calibration of blade load sensors during operation of the wind turbine by recording several minutes of data (or indications or load measurements) from the blade load sensors. For example, data from the load sensors may be recorded e.g. when predetermined conditions for calibration are met during idle operation of the wind turbine at low winds. Some of said predetermined conditions may be obtained after several hours or days of idling operation of the wind turbine. Therefore, a drawback of this type of calibration may be that it can take a long time, depending on the wind conditions.

For example, the international patent application WO 2011/092032 A1 discloses a calibration method of the type commented in the previous paragraph. This method comprises the steps of: a) determining a rotor azimuth angle, b) determining a pitch angle of a first wind turbine blade, c) measuring loads in a first cross-section of the first wind turbine blade using a first load sensors, d) calculating theoretical loads based on at least the rotor azimuth angle and the pitch angle of the blade determined in steps a) and b), e) comparing the loads measured in step c) with the theoretical loads calculated in step d), and f) calibrating the first load sensors based on the comparison of step e).

The method of WO 2011/092032 A1 allows calibrating the sensors onsite while the blades are mounted on the turbine, i.e. without needing to dismount the blades from the turbine. The calibration may be performed while the turbine is running and connected to the grid. A system is continuously logging the relevant data (turbine operating conditions and sensor measurements), and after some time it has collected enough data to be able to do a reliable calibration of the sensors. The calibration is done fully automatic. However, as argued before, execution of this method can take a long time.

SUMMARY OF THE INVENTION

There thus still exists a need for methods of calibrating blade load sensors and for wind turbines that resolve at least some of the above mentioned problems. It is an object of the present invention to fulfil such a need.

In a first aspect, the present invention provides a method of calibrating one or more load sensors of a blade of a wind turbine, said wind turbine comprising a main generator, a power electronic converter connected with the main generator, and a rotor operationally connected with the main generator and carrying the blade. The method comprises acting on the power electronic converter to operate the main generator as motor to set the blade in at least one predetermined condition. The method further comprises measuring loads in the predetermined condition using the load sensors of the blade. And the method also comprises calibrating the blade load sensors taking into account the measured loads.

One of the keys of this method is the change of role of the main generator. The generator may be operated as motor if the power electronic converter provides suitable power to it. This way, different predetermined conditions of the rotor and blades in accordance with e.g. related calibration patterns may be easily obtained. For each of said predetermined conditions, load measurements from the load sensors can be obtained and compared to reference loads to calibrate the load sensors.

These reference loads may in some embodiments be calculated theoretical loads, wherein the calculations are based on a theoretical model of a blade. In addition or alternatively to these calculated theoretical loads, the measured loads may also be compared to values that were experimentally obtained under controlled conditions. For instance, if calibration of the sensors with the blade in horizontal and static position is desired, the measured loads may be compared to theoretical values calculated from a model considering all or some features of the blade (mass, moment of inertia, etc.). They may also be compared to load values obtained with high accuracy and reliability under controlled conditions (e.g. in the factory).

Thus, the proposed new method permits obtaining particular conditions for calibration of blade load sensors independently of wind conditions. Said independence from external conditions allows obtaining particular conditions for calibration in a substantially direct manner, without necessity of waiting for random situations. Therefore, the time for calibrating the blade load sensors may be highly reduced in comparison with the known automatic calibration methods.

In a second aspect of the invention, a wind turbine is provided that comprises a main generator, a power electronic converter connected with the main generator, at least one blade having one or more load sensors, and a rotor carrying the blade and operationally connected with the main generator. This wind turbine further comprises a control unit configured to perform a method for calibrating the load sensors of the blade. This method comprises acting on the power electronic converter to operate the main generator as motor to set the blade in at least one predetermined condition. The method further comprises measuring loads in the predetermined condition using the load sensors of the blade and comprises calibrating the blade load sensors taking into account the measured loads.

The wind turbine of this second aspect is suitable to perform the method of the previously commented first aspect. Thus, the principles and advantages commented with respect to said method may also be of application to this wind turbine.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which:

FIGS. 3 and 4 are schematic representations of a wind turbine in further predetermined conditions.

DETAILED DESCRIPTION OF EMBODIMENTS OF THE INVENTION

In the following description, numerous specific details are set forth in order to provide a thorough understanding of the present invention. It will be understood by one skilled in the art however, that the present invention may be practiced without some or all of these specific details. In other instances, well known elements have not been described in detail in order not to unnecessarily obscure the description of the present invention.

Figure 1:
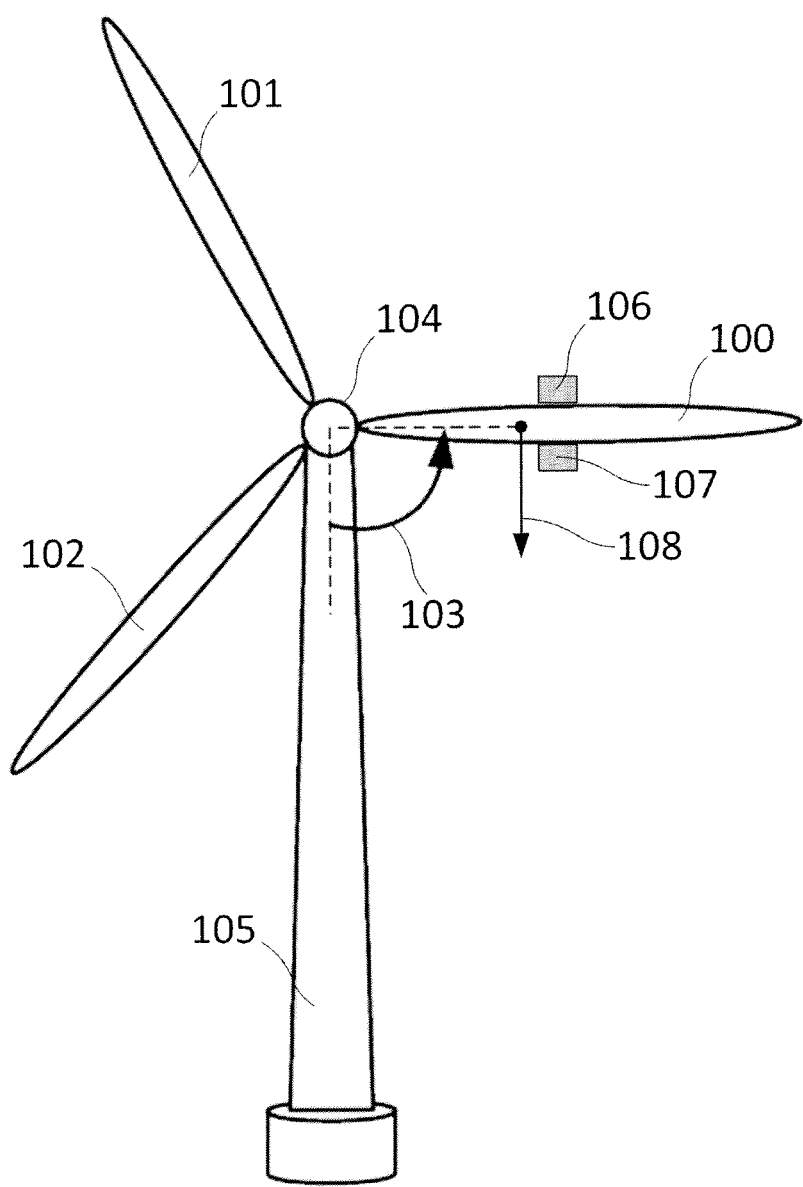
FIG. 1 is a schematic representation of a wind turbine in a first predetermined condition, according to an embodiment of the invention.

FIG. 1 schematically represents a wind turbine according to a first embodiment of the invention. This wind turbine comprises a main generator (not shown), a power electronic converter (not shown) connected with the main generator, and a rotor 104 carrying the blades 100-102 and being operationally connected with the main generator. The rotor comprises a first blade 100 and two more blades 101,102, the first blade 100 having a first sensor 106 and a second sensor 107. The wind turbine may also comprise a control unit (not shown) configured to perform an embodiment of the method of calibrating the blade load sensors 106,107.

This embodiment of the method for calibrating the blade load sensors 106,107 may comprise acting on the power electronic converter to operate the main generator as motor to set the first blade 100 in a substantially horizontal position, i.e. said first blade 100 having an azimuth angle 103 of ninety degrees, and maintain said position. This horizontal position causes that the main load acting on the first blade 100 is the gravity 108, i.e. the weight of the blade 100.

Still in reference to FIG. 1, the embodiment of the method may further comprise measuring loads using the load sensors 106,107 of the first blade 100 in said horizontal position, and obtaining reference loads corresponding to the same horizontal position of the first blade 100. Finally, the method may comprise comparing the measured loads with the obtained reference loads. Then, in case of said comparison producing some inconsistency, some predetermined adjustments can be performed on the load sensors 106,107 for solving said inconsistency and improving accuracy of the sensors 106,107. The reference loads may be calculated loads, e.g. based on a theoretical model of the blade. The reference loads may also be experimental loads obtained under controlled conditions, e.g. in the factory.

Figure 2:
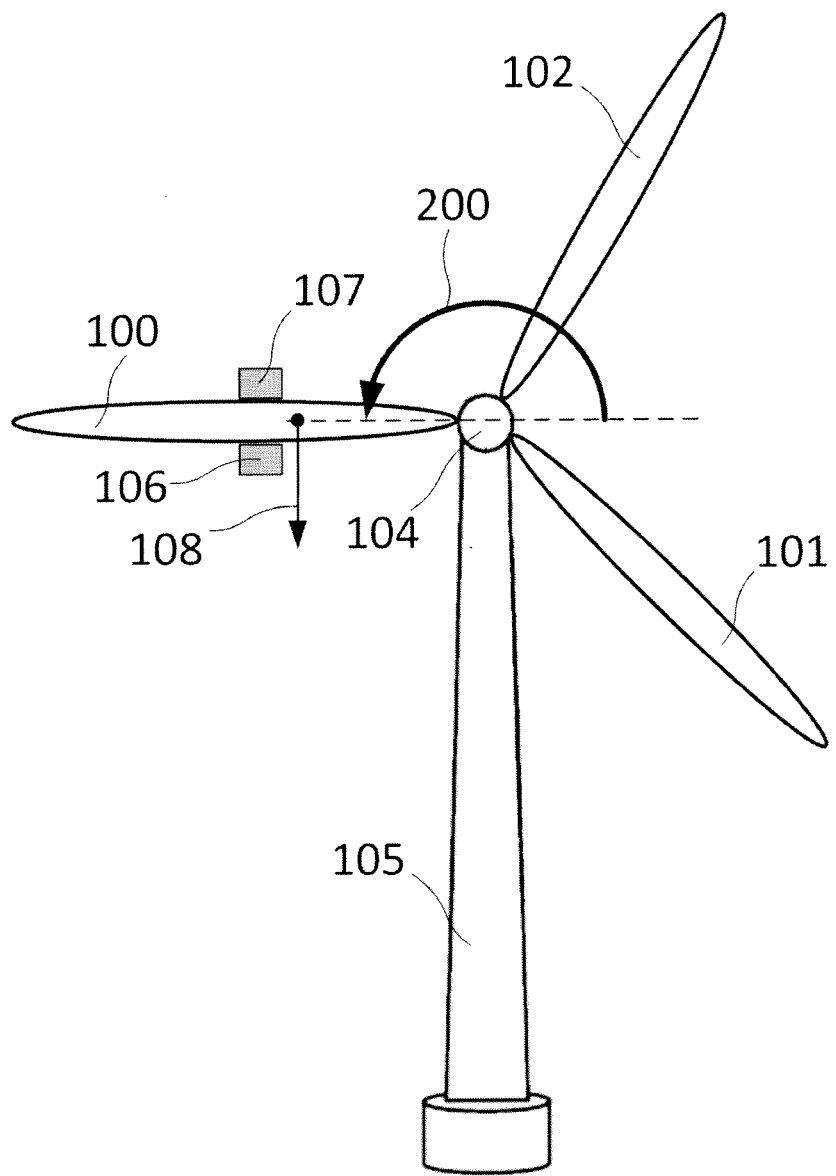
FIG. 2 is a schematic representation of the wind turbine of FIG. 1 in a second predetermined condition, according to an embodiment of the invention.

FIG. 2 shows the same wind turbine of FIG. 1 but with the blades 100-102 in another position that may be interesting for calibrating the first load sensor 106 and the second load sensor 107. In this case, embodiments of the method may comprise acting on the power electronic converter to operate the main generator as motor to set the first blade 100 in the second position of FIG. 2, said second position resulting from rotating the rotor substantially one hundred and eighty degrees 200 with respect to the first position of FIG. 1.

Once the first blade 100 is in the second position of FIG. 2, the embodiment of the method may further comprise equivalent actions to the steps described in reference to the FIG. 1, but in this case for calibrating the load sensors 106,107 in this second position. Therefore, loads may be measured using the load sensors 106,107 in this second position, reference loads (theoretical or experimental loads) may be obtained in this second position, and said measured loads may be compared with said reference loads. Finally, if said comparison produces some inconsistency, predetermined adjustments on the load sensors 106,107 may be performed to correct said inconsistency.

The second position of FIG. 2 may be used as an alternative to the first position of FIG. 1, or both the first and the second positions may be combined for calibrating the load sensors 106,107. According to this principle, embodiments of the method may take into account that the measured loads in the first position may keep some kind of symmetry with respect to the measured loads in the second position. Therefore, calibration of the blade load sensors 106,107 may comprise comparing the measured loads in the first position with the measured loads in the second position.

In said comparison of measured loads in the first position with measured loads in the second position, it could be considered that the loads measured by the first sensor 106 in the first position should substantially have the same values than the loads measured by the second sensor 107 in the second position. Equivalently, it could be also considered that the loads measured by the second sensor 107 in the first position should substantially have the same values than the measured loads by the first sensor 106 in the second position.

It make sense to presume said cross equivalencies (or symmetries) between measured loads because the gravity 108 (i.e. weight of the blade) is the main load acting on the first blade 100 in the ways shown in both FIGS. 1 and 2. Taking into account said symmetries makes the calibration of the sensors 106,107 more reliable, since it represents an additional way of tallying different measured loads in different conditions.

Alternatively or in addition to the embodiments described in reference to FIGS. 1 and 2, the calibration method may also comprise setting the rotor 104 carrying the blades 100-102 to rotate at a substantially constant rotational speed. This embodiment of the method may further comprise measuring loads using the load sensors 106,107 of the first blade 100 at said substantially constant rotational speed. Furthermore, reference loads corresponding to said constant speed may be obtained and compared to the measured loads.

Embodiments of the wind turbine may further comprise one or more position sensors for measuring the rotational position of the blades 100-102. Thanks to these position sensors, embodiments of the method causing rotation of the rotor 104 at a constant speed may further comprise measuring positions of the blades 100-102. And said embodiments may further comprise obtaining correlation between measured positions and loads, and calibrating the blade load sensors 106,107 taking into account said correlation.

For example, when the rotor 104 and blades 100-102 rotates at a constant speed, cyclical bending loads are induced on the blades 100-102, said loads ideally having over time a representation of sine curve form. Equally, it may be considered that the measured positions may also have over time a representation of sine curve form. Thus, a correlation between the sine curve of the loads over time and the sine curve of the positions over time may be obtained. This correlation may permit e.g. calculating possible gaps between measured loads and positions over time, such that possible delays of the sensors 106,107 may be detected and, thus, used for calibrating the sensors 106,107.

This correlation and consistency of data between measured loads and positions over time thus permits making the calibration method more reliable, since it represents an additional way of tallying different values of measures. In this particular case, values of different nature (loads and positions) may be compared in some way to obtain additional indicators for a more accurate calibration of the sensors 106,107.

In the embodiments based on causing rotation of the rotor 104 at a constant rotational speed, said rotation and consequent actions (e.g. measuring loads, measuring positions, comparing measured loads and positions, etc) may be repeated at different rotational speeds.

Calibrating load sensors under one or more constant rotational speeds of the rotor/blade is especially advantageous because the response of the sensors to a same load may depend on whether the blade is in a static or in a dynamic situation. In this sense, recalibration of the sensors not only in static conditions but also in movement conditions at different speeds is very convenient. Many prior art calibration systems and methods are mainly based on static conditions and normally assume that a good calibration in static implies good calibration in movement. However, this assumption may not always be correct. Calibration at different speeds provided in the context of the present invention permits having the sensors completely calibrated in both static and dynamic conditions in a relatively simple manner and in a quite short time.

Some embodiments of the wind turbine may further comprise, for each blade of the wind turbine, a pitch system for changing a pitch angle of the blade. This wind turbine may be suitable for performing embodiments of the calibration method comprising acting on the pitch system to set the blade in at least one predetermined pitch angle. In this sense, FIG. 3 shows an embodiment of the wind turbine of this type and two possible pitch angles that may be taken into account for calibrating load sensors.

Particularly. FIG. 3a shows a frontal view of an embodiment of the wind turbine that comprises a first blade 300 and two more blades 301,302, said first blade 300 having several load sensors 305-307, and a rotor 310 carrying the blades 300-302. FIG. 3b shows a lateral view of a region 308 of the wind turbine from a lateral point of vision 309, in which the first blade 300 has a determined pitch angle 312. And FIG. 3c shows a lateral view of the region 308 of the wind turbine from the same lateral point of vision 309, in which the first blade 300 has another pitch angle.

FIG. 3b and FIG. 3c show a first load sensor 306 and a second load sensor 307 that are positioned in a flapwise axis of the blade 300. FIG. 3b and FIG. 3c also show a third load sensor 305 and a fourth load sensor 311 which are positioned in an edgewise axis of the blade 300. In FIG. 3b, the blade 300 has a pitch angle 312 of ninety degrees, whereas in FIG. 3c, the blade 300 has a pitch angle of zero degrees. The pitch angle 312 of ninety degrees may be optimum to calibrate the first sensor 306 and the second sensor 307, since said ninety degrees may maximize the sensitivity of said sensors 306,307 to e.g. loads caused by the weight of the blade 300. The pitch angle of zero degrees may be optimum to calibrate the third sensor 305 and the fourth sensor 311, since said zero degrees may maximize the sensitivity of said sensors 305,311 to e.g. loads caused by the weight of the blade 300.

Figure 3:
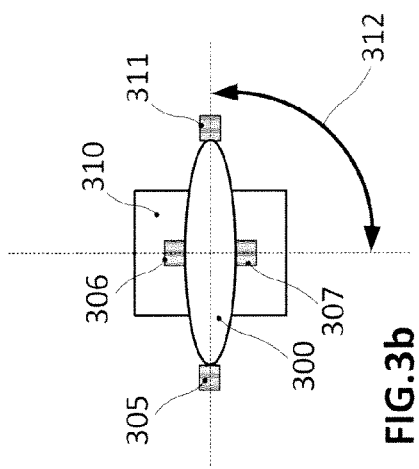
Figure 3:
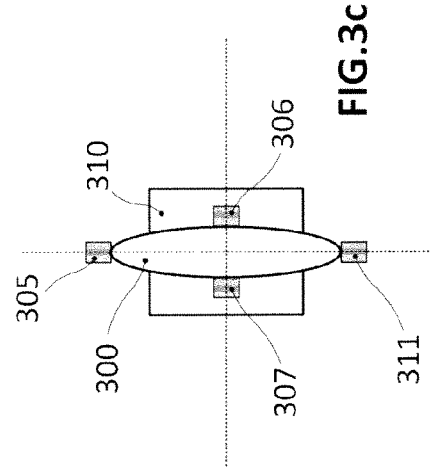
Figure 3:
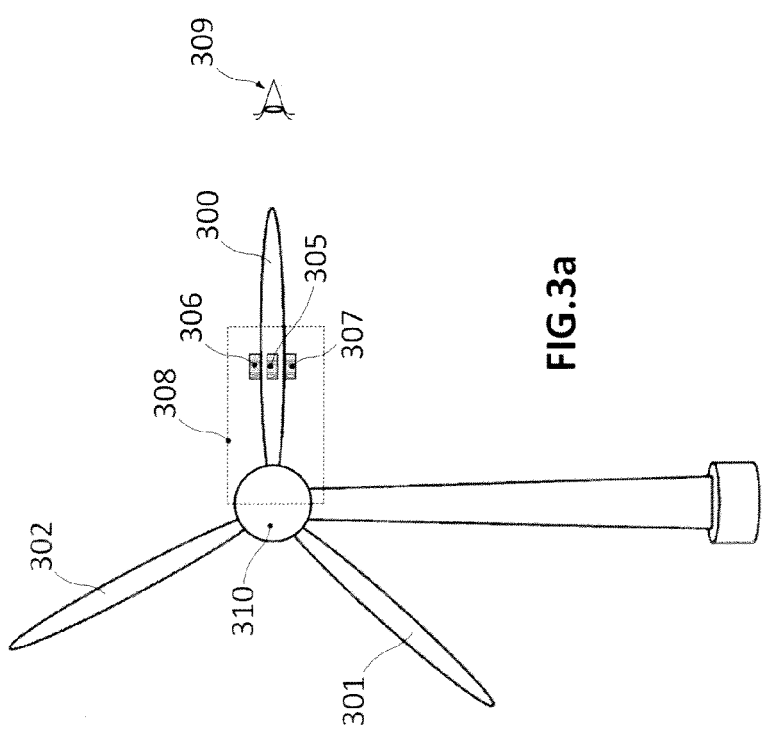

FIG. 4 refers to a wind turbine very similar to the wind turbine of FIG. 3, with the only difference of that the first load sensor 306 and the second load sensor 307 are not positioned in an edgewise axis. In particular, FIG. 4a shows a lateral view very similar to the view of FIG. 3b, with the only difference of that the first load sensor 306 and the second load sensor 307 are not positioned exactly in an edgewise axis. FIG. 4b shows the same view of FIG. 4a with the only difference of that the blade 300 has a pitch angle 400 different from the pitch angle 312 of FIG. 4a.

When the position of load sensors 306,307 for e.g. constructive reasons is not in the same edgewise axis, as shown in FIGS. 4a and 4b, the sensors 306,307 may be sensitive to loads in different directions. In this case, embodiments of the method may cause intermediate pitch angles 400 (between zero and ninety degrees), as shown in FIG. 4b, to estimate the offset (with respect to an edgewise axis) in the placement of the sensors 306,307. This estimation of the offset between edgewise sensors 306,307 may be used to correct the measurements given by the sensors 306,307. This principle in relation to positional offsets between edgewise sensors 306, 307, may be equivalently applied to flapwise sensors 305,311 if they are not placed in a flapwise axis of the blade 300.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described before, but should be determined only by a fair reading of the claims that follow.

The invention claimed is:

1. A method of calibrating one or more load sensors of a blade of a wind turbine, wherein the wind turbine comprises:
   a main generator;
   a power electronic converter connected with the main generator;
   a rotor operationally connected with the main generator and carrying the blade;

wherein the method comprises:
acting on the power electronic converter to operate the main generator as a motor to set the blade in at least two predetermined conditions comprising a first position such that the blade has a substantially horizontal position and a second position resulting from rotating the rotor substantially 180 degrees with respect to the first position;
measuring loads in the predetermined conditions using the blade load sensors; and
calibrating the blade load sensors taking into account the measured loads, comprising comparing measured loads in the first position with measured loads in the second position.

2. The method according to claim 1, wherein the wind turbine comprises a pitch system for changing a pitch angle of the blade; and wherein setting the blade in the predetermined conditions comprises acting on the pitch system to set the blade in at least one predetermined pitch angle.

3. A method of calibrating load sensors of a plurality of blades of a wind turbine, comprising repeating the method according to claim 2 for each blade of the plurality of blades.

4. A method of calibrating load sensors of a plurality of blades of a wind turbine, comprising repeating the method according to claim 1 for each blade of the plurality of blades.

5. The method according to claim 1, wherein calibrating the blade load sensors comprises:
obtaining reference loads corresponding to the predetermined conditions;
comparing the measured loads with the reference loads.

6. The method according to claim 5, wherein the reference loads are theoretical loads based on a model of the blade.

7. The method according to claim 5, wherein the reference loads are measured loads obtained experimentally under controlled conditions.

8. A method of calibrating load sensors of a plurality of blades of a wind turbine, comprising repeating the method according to claim 1 for each blade of the plurality of blades.

9. A method of calibrating one or more load sensors of a blade of a wind turbine, wherein the wind turbine comprises:
a main generator;
a power electronic converter connected with the main generator;
a rotor operationally connected with the main generator and carrying the blade;
wherein the method comprises:
repeating for different blade rotational speeds:
acting on the power electronic converter to operate the main generator as a motor to set the rotor carrying the blade at a substantially constant rotational speed;
measuring loads using the blade load sensors at the substantially constant rotational speed; and
calibrating the blade load sensors taking into account the measured loads.

10. The method according to claim 9, wherein the wind turbine further comprises one or more position sensors for measuring the rotational position of the blade; and wherein calibrating the blade load sensors comprises:
measuring positions of the blades using the position sensors;
obtaining a correlation between measured positions and loads; and
calibrating the blade load sensors taking into account the correlation between measured positions and loads.

11. The method of calibration comprising repeating the method according to claim 10 at different rotational speeds.

12. A method of calibrating load sensors of a plurality of blades of a wind turbine, comprising repeating the method according to claim 9 for each blade of the plurality of blades.

13. A wind turbine comprising:
a main generator;
a power electronic converter connected with the main generator;
at least one blade having one or more load sensors;
a rotor operationally connected with the main generator and carrying the blade; and
a control unit configured to perform a method that comprises:
acting on the power electronic converter to operate the main generator as a motor to set the blade in at least two predetermined conditions comprising a first position such that the blade has a substantially horizontal position and a second position resulting from rotating the rotor substantially 180 degrees with respect to the first position;
measuring loads in the predetermined conditions using the blade load sensors; and
calibrating the blade load sensors taking into account the measured loads, comprising comparing measured loads in the first position with measured loads in the second position.

14. A wind turbine comprising:
a main generator;
a power electronic converter connected with the main generator;
at least one blade having one or more load sensors;
a rotor operationally connected with the main generator and carrying the blade; and
a control unit configured to perform a method that comprises:
repeating for different blade rotational speeds:
acting on the power electronic converter to operate the main generator as a motor to set the rotor carrying the blade at a substantially constant rotational speed;
measuring loads using the blade load sensors at the substantially constant rotational speed; and
calibrating the blade load sensors taking into account the measured loads.

* * * * *